United States Patent
Weirich

(10) Patent No.: US 6,914,394 B2
(45) Date of Patent: Jul. 5, 2005

(54) SUPPLY CIRCUIT, IN PARTICULAR FOR A DISCHARGE LAMP

(75) Inventor: Michael Weirich, Unterhaching (DE)

(73) Assignee: Patent Treuhand Gesellschaft fur elektrische Gluhlampen mbH, Munich (DE)

(*) Notice: Subject to any disclaimer, the term of this patent is extended or adjusted under 35 U.S.C. 154(b) by 0 days.

(21) Appl. No.: 10/606,211

(22) Filed: Jun. 26, 2003

(65) Prior Publication Data

US 2004/0051479 A1 Mar. 18, 2004

(30) Foreign Application Priority Data

Jun. 27, 2002 (DE) .......................... 102 28 742

(51) Int. Cl.[7] .......................... H05B 41/24; H02M 5/41; H02M 3/335
(52) U.S. Cl. .......................... 315/291; 315/247; 315/307; 315/219; 463/41; 463/97; 463/20; 463/89; 463/80; 463/21.01
(58) Field of Search .......................... 315/291, 247, 315/224, 225, 308, 209 R, 307; 363/21.01, 89, 80, 41, 97, 20, 37, 222; 323/222, 210

(56) References Cited

U.S. PATENT DOCUMENTS

| | | | |
|---|---|---|---|
| 5,498,995 A | 3/1996 | Szepesi et al. .............. | 327/538 |
| 5,757,627 A | 5/1998 | Faulk .......................... | 363/21 |
| 6,222,746 B1 * | 4/2001 | Kim ............................ | 363/89 |
| 6,301,135 B1 | 10/2001 | Mammano et al. ........... | 363/95 |
| 6,605,906 B2 * | 8/2003 | Okamoto et al. ............ | 315/291 |
| 2003/0146714 A1 * | 8/2003 | Buonocunto ................ | 315/247 |

FOREIGN PATENT DOCUMENTS

| | | | |
|---|---|---|---|
| EP | 0230930 | 8/1987 | .......... H02M/3/335 |
| JP | 01004102 | 1/1989 | ........... H03B/5/36 |
| JP | 05315956 | 11/1993 | ........... H03L/7/24 |
| WO | WO 01/26213 A1 | 4/2001 | ........... H03B/5/12 |
| WO | WO 01/61832 A2 | 8/2001 | |

OTHER PUBLICATIONS

Search Report (5 pages) for corresponding European application; search report was issued by the European Patent Office on Nov. 17, 2004.

* cited by examiner

*Primary Examiner*—Don Wong
*Assistant Examiner*—Chuc Tran

(57) ABSTRACT

The invention relates to a supply circuit for a load, and in particular to an electronic ballast for a lamp having such a supply circuit. In order to drive a switching transistor T1 of the supply circuit, a forcing circuit ZS is used which is supplied by the supply circuit. At the start of operation, an oscillation of an oscillator circuit OS, which can preferably serve as an amplifier for the forcing circuit ZS in the continuous operating mode, is used for driving.

6 Claims, 1 Drawing Sheet

SUPPLY CIRCUIT, IN PARTICULAR FOR A DISCHARGE LAMP

TECHNICAL FIELD

The present invention relates to a supply circuit and to an electronic ballast for lamps. A supply circuit is understood here to be a circuit which makes available an electric supply current for a load. In doing so, it can condition the electric supply current in a way which is matched to the load, that is to say can convert it from a supplied A.C. voltage into a D.C. voltage, or vice versa, change its frequency, transform its voltage, etc. The term supply circuit therefore includes in particular supply rectifier circuits, supply oscillator circuits and supply transformers, that is to say converters for supply purposes in the general sense.

BACKGROUND ART

With such supply circuits, there are frequently switching transistors which are essential for the operation and whose control input has to be driven in a suitable way in order to ensure the functionally correct operation of the supply circuit. The invention relates here to the case in which the control input of the switching transistor is driven by a forcing circuit. In other words, the invention does not relate to circuits whose continuous operation is based on a self-excitation mechanism.

DISCLOSURE OF THE INVENTION

The invention is based on the technical problem of specifying an improved supply circuit with a switching transistor and a forcing circuit.

For this purpose, the invention provides an oscillator circuit which is connected to the control input of the switching transistor and is configured in such a way that a startup operation of the supply circuit firstly carries out an oscillation which is independent of the forcing circuit and in doing so actuates the control input of the switching transistor, the supply circuit being configured in such a way that the forcing circuit is supplied, as a result of the driving of the control input by the oscillator circuit, by a supply current produced by the supply circuit, and subsequently performs the driving of the control input of the switching transistor.

In addition, the invention also relates to an electronic ballast for a lamp, in which ballast such a supply circuit is used.

Preferred embodiments of the invention are given in the dependent claims.

The invention is based on the recognition that the power supply of the forcing circuit in the case of the supply circuits described constitutes a particular problem. On the one hand, the forcing circuit is necessary for the function of the supply circuit which is based on the switching operation of the switching transistor. Therefore, the forcing circuit itself cannot readily be operated with a supply current which is made available by the supply circuit itself. Instead, supply currents for the forcing circuit are conventionally branched off from the input current of the supply circuit via voltage divider circuits. Firstly, this has the disadvantage that the respective resistances lead to an additional power consumption.

Secondly, the supply circuit can generate, among other things, supply currents which are better suited to supply the forcing circuit, but which are not available at the startup operation of the supply circuit because the forcing circuit is not yet operating then owing to lack of driving of the switching transistor.

It would then be conceivable to provide, for the startup operation, for the forcing circuit to be supplied by means of a voltage divider circuit and for the forcing circuit to be then switched over to being supplied from the supply circuit after the supply circuit has begun to function. However, the resistances of the voltage divider circuit would then be associated with a continuous power consumption which is not necessary during the continuous operating mode. If it were desired to solve this by means of a switching capability of the voltage divider circuit, a correspondingly high voltage-proof switch would be necessary which would considerably increase the technical expenditure.

The invention is based on the idea that, for the startup operation of the supply circuit, there is provision for the control input of the switching transistor to be driven by means of an oscillator circuit. This may be a quite simple circuit with a comparatively low voltage consumption, for example, a simple, self-excited analog oscillator. At any rate, this oscillator circuit can be operated with a comparatively low current which can be tapped, for example, by means of a resistor or a voltage divider circuit at the supply input of the supply circuit. In contrast, the forcing circuit may be of more complex design, and thus have a greater power requirement, owing to the requirements which the supply circuit makes of the driving of the switching transistor in the continuous operating mode.

If the functioning of the supply circuit by means of the driving of the switching transistor by the oscillator circuit has been set in initiated, as it were, as an emergency operating mode, the supply circuit can perform the function of supplying the forcing circuit, in response to which the latter performs the driving in a way which is configured for the continuous operating mode and is correspondingly optimized. The invention therefore distinguishes between driving of the switching transistor at the start of operation via an oscillator circuit with power consumption which is as reduced as possible, on the one hand, and continuous driving of the switching transistor after the supply circuit starts to function by a forcing circuit which is provided especially for this purpose, on the other.

The invention is preferably configured in such a way that the oscillator circuit is simultaneously an amplifier circuit which can function as an oscillator owing to a feedback. This amplifier circuit is then switched between the forcing circuit and the control input of the switching transistor and, when the driving of the switching transistor is taken over by the forcing process, serves as an amplifier for the control signals of said forcing process. Here, it is necessary to allow for the fact that if the forcing circuit is, for example, a digital circuit, an amplifier circuit is generally necessary for driving the switching transistor. Such an amplifier circuit is also referred to in digital circuits as a driver circuit, it being intended that no particular distinction should be made below between amplifiers and drivers. The amplifier circuit contains amplifier transistors so that an oscillator circuit according to the invention can be implemented with little expenditure by inserting a feedback. It is then necessary to find a suitable way of switching over between the two operating states as an oscillator circuit and as an amplifier circuit. More details will be given on this below.

The supply circuit according to the invention preferably is, or contains, what is referred to as a power factor correction circuit (or PFC circuit for power factor correction).

Such circuits are used in particular in providing a D.C. supply from an A.C. voltage in order to reduce the harmonic component of the currents extracted from the A.C. voltage supply. For example, this may be a step-up converter or a SEPIC converter. The SEPIC converter is particularly preferred. Power factor correction circuits are used to ensure a power drain which is as sinusoidal as possible, for example from an A.C. voltage system, and in doing so charge a storage capacitor to a D.C. voltage which is as constant as possible as a supply voltage for downstream circuit parts. Here, the charging and discharging processes of the coils and capacitors interact, the switching operation of the switching transistor which has already been mentioned repeatedly being of essential importance. The method of operation of these power factor correction circuits is known to a person skilled in the art and does not need to be explained in more detail here. The method of operation of the SEPIC converter is, however, summarized briefly in the description of the exemplary embodiment.

The forcing circuit is preferably a digital circuit and particularly preferably a programmable digital control circuit or what is referred to as a microcontroller. The digital control circuit or the microcontroller can also be used for driving further circuit components, in particular can also be responsible for driving a circuit which is supplied with D.C. voltage from the power factor correction circuit.

Switching over or discriminating between the two operating states as an oscillator circuit and as an amplifier circuit is preferably carried out as a function of the electrical state of the input of the oscillator circuit. This can ensure that the correct operating state of the oscillator circuit is already predefined by the operating state of the forcing circuit alone. In the case of a digital input of the oscillator circuit, it is possible, for example, for the amplifier or driver function to be assigned at a defined logic input level, and the operating state as an oscillator circuit to be predefined at a nonspecific intermediate state (in the case of what is referred to as tri-state output of the forcing circuit). Even in the case of analog circuits, the level of the impedance of the input with respect to a reference potential, for example ground or a supply potential, may be decisive.

However, the invention is not restricted to these solutions. For example, chronological criteria are also possible for discriminating between the two operating states and can be implemented by means of an RC constant or in some other way. In addition to a time definition, intervention into the aforementioned feedback, for example, the opening of a switching transistor, or a digital solution, for example inversion of a phase shift or the like, are also possible.

However, it is preferred to discriminate by means of the electrical state of the oscillator circuit input. If the oscillator circuit is an analog free-running oscillator with the possibility of forcing by means of the input, it is particularly easy to discriminate by means of the impedance of the input.

The invention is also aimed at an electronic ballast for a lamp in which the supply circuit according to the invention is included. The lamp could be, for example, a halogen incandescent lamp. In halogen incandescent lamps, electronic transformers, which are supply circuits in the sense of the invention and can be described as externally controlled generators with a switching transistor, are frequently used to generate the desired operating voltage. There is generally no power factor correction circuit provided here. Nevertheless, the invention may be advantageous.

However, it is preferred to apply the invention in an electronic ballast for a discharge lamp, in particular a low-pressure discharge lamp. Here, high-frequency oscillators are used which are supplied by a D.C. voltage supply. This D.C. voltage supply contains both a bridge rectifier and a power factor correction circuit with the switching transistor which is essential to the invention. If the ballast is an electronic ballast for a discharge lamp in which no power factor correction circuit is provided, the invention can also be used with respect to the switching transistors of the high-frequency oscillator, for example of a half-bridge oscillator.

Moreover, the aforementioned digital forcing circuit or the microcontroller is preferably also responsible for driving the switching transistors of such a high-frequency oscillator. Microcontrollers which are also configured for forcing a half-bridge oscillator including corresponding programs for specific lamp operating states or fault detection functions do in fact require a considerable power supply. The oscillator circuit according to the invention can bring about a significant reduction in the power drain by the aforementioned voltage divider circuit or some other supply so that an excessively large level of energy consumption during the ongoing operating mode can be avoided.

BRIEF DESCRIPTION OF THE DRAWINGS

The individual aspects of the invention will be explained below in more detail by means of an exemplary embodiment. Individual features which are disclosed here may also be essential to the invention in other combinations. As a precaution, it is to be noted that the description above and the description below are to be understood as referring to one operating method to the same extent.

BEST MODE FOR CARRYING OUT THE INVENTION

Figure 1:
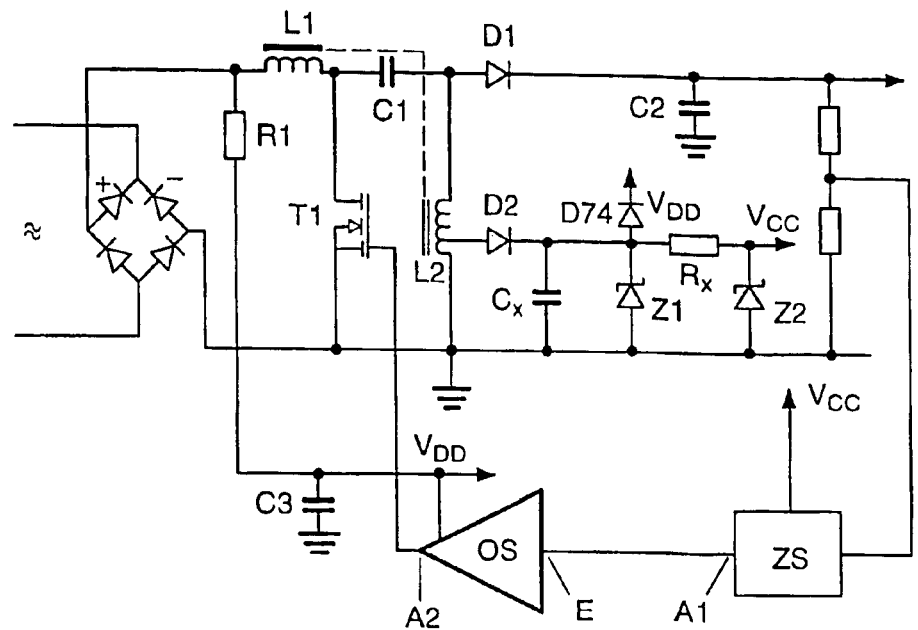
FIG. 1 shows a schematic block circuit diagram of a supply circuit according to the invention.

FIG. 1 illustrates a supply circuit according to the invention as an exemplary embodiment. On the left it is apparent that a supply A.C. voltage, for example a customary domestic power system voltage, is rectified by means of a diode rectifier bridge. As a result, a rectified positive potential is present in the figure on the line branch running horizontally at the top, and a rectified negative potential, generally connected to ground, is present at the bottom. The rectified A.C. voltage forms the input of a SEPIC converter which has the coils (inductors) L1 and L2, the capacitor C1, the rectifier diode D1 and the switching transistor T1 and is regulated by the forcing circuit ZS. A load which is supplied with a D.C. voltage which is made available by the capacitor C2 is connected to the output of the SEPIC converter which is shown on the right, that is to say in parallel with a storage capacitor C2. The load is a customary half-bridge oscillator with two switching transistors for generating a high-frequency A.C. voltage with which a low-pressure gas discharge lamp can be operated. As such circuits are the prior art and are generally known, the load is not illustrated here.

The capacitor C2 serves as a storage capacitor and must be charged to a D.C. voltage which is as constant as possible by the SEPIC converter from the rectified A.C. voltage. The current drain from the power system should follow the sinusoidal profile of the power system voltage here with as little disruption as possible.

By means of an alternating switching operating mode of the switching transistor T1, the coil L1 is charged to a specific current from the rectified power system voltage in the switched-on state, and is discharged into the capacitor C1 in the switched-off state of the switching transistor T1. In the same way, the coil L2 is charged in the switched-on times of the switching transistor T1, and discharged into the storage capacitor C2 in the switched-off times. (The polarity of the diode D1 is to be noted). Here there is what is referred to as an intermittent operating mode where the switched off times of the switching transistor T1 are sufficiently long for the current in the rectifier diode D1 to drop to zero. Here, on average, the capacitor C1 remains charged to the value of the instantaneous rectified supply voltage. Essentially any desired D.C. voltage can thus be set at the capacitor C2 by means of a corresponding pulse duty factor, that is to say with a ratio between the switched-on times and switched-off times, and by taking into account the load.

The switched-on times and the switched-off times of the switching transistor T1 are predefined by the abovementioned forcing circuit ZS. The forcing circuit ZS is preferably part of a microcontroller which is also used to control the half-bridge oscillator circuit and in which all the programs which are necessary to operate the electronic ballast are stored. The forcing circuit ZS can keep the voltage at C2 constant by means of the illustrated tapping of the voltage at the capacitor C2 by said forcing circuit ZS. The forcing circuit ZS has to be supplied with an operating voltage $V_{CC}$, which, as is shown by FIG. 1, is formed from a tap at the coil L2, using a rectifier diode D2, two Zener diodes $Z_1$ and $Z_2$, a capacitor $C_X$ and a resistor $R_X$. In addition, a second supply voltage $V_{DD}$—on which more details will be given later—is formed at the tap. For this reason two Zener diodes are provided for stabilization, the two supply voltage taps being separated from one another by means of the resistor. The supply voltage $V_{CC}$ is not generated until the charging and discharging processes of the coil L2 caused by the switching operation of the transistor T1 have been initiated. If the transistor T1 is not driven, the supply voltage $V_{CC}$ is therefore not available.

The connection of the two coils L1 and L2 which is shown in FIG. 1 does not have any significance for the invention and is one of the customary measures when optimizing SEPIC converters. The connection serves in particular to provide interference suppression and is not explained here in its details.

A typical order of magnitude for the supply voltage $V_{CC}$ of the microcontroller is 3.3 V or 5 V. The control output A1—illustrated in FIG. 1—of the forcing circuit ZS can correspondingly generate only signal levels between 0 and the supply voltage $V_{CC}$, as indicated in FIG. 1. In order to drive the switching transistor T1, an oscillator layer OS which serves as an amplifier or driver is therefore used here, the control output A1 of the forcing circuit being connected to the input E of said oscillator layer OS. The oscillator circuit OS generates, at its output A2, a corresponding drive signal for the control input of the switching transistor T1. This drive signal can assume levels between 0 and the already mentioned supply voltage $V_{DD}$ with which the oscillator circuit OS is supplied. This supply voltage $V_{DD}$ can also be acquired at the tap of the coil L2, as indicated in FIG. 1. However, the supply voltage $V_{DD}$ can also be tapped by means of a resistor R1 on the positive branch at the input of the SEPIC converter and output of the rectifier bridge, a capacitor C3 which is connected to ground serving to store energy. The supply voltage $V_{DD}$ is therefore already available a short time (50–100 ms) after the application of the power system A.C. voltage to the rectifier bridge without the switching operation of the transistor T1 being required.

It is essential here that the power demand of the oscillator circuit OS is significantly less than that of the forcing circuit ZS or of the microcontroller. For this reason, the resistor R1 may be relatively large with the result that in the continuous operating mode only low currents are extracted via R1. The power supply via R1 and C3 is therefore sufficient here only for the oscillator circuit OS. The capacitor C3 has stored so much energy as a result of the aforementioned initial charging via R1 that the oscillator circuit OS can be supplied for a sufficiently long time, for example approximately 10 ms. Within this time, the actual supply from the coil L2 must be stable, more details of which will be given later. During the further operation, the charging of the capacitor C3 via R1 does not have a disruptive effect owing to the comparatively low current.

A typical value for the voltage $V_{DD}$ is 10–15 V, the voltage being the voltage level predefined by the control input of the switching transistor T1. The oscillator circuit OS therefore serves to amplify the voltage of the signals of the output A1 of the forcing circuit ZS. However, the oscillator circuit OS also has a current amplifier function as the capacitive recharging processes of the control input of the switching transistor T1 also have to be "driven".

Figure 2:
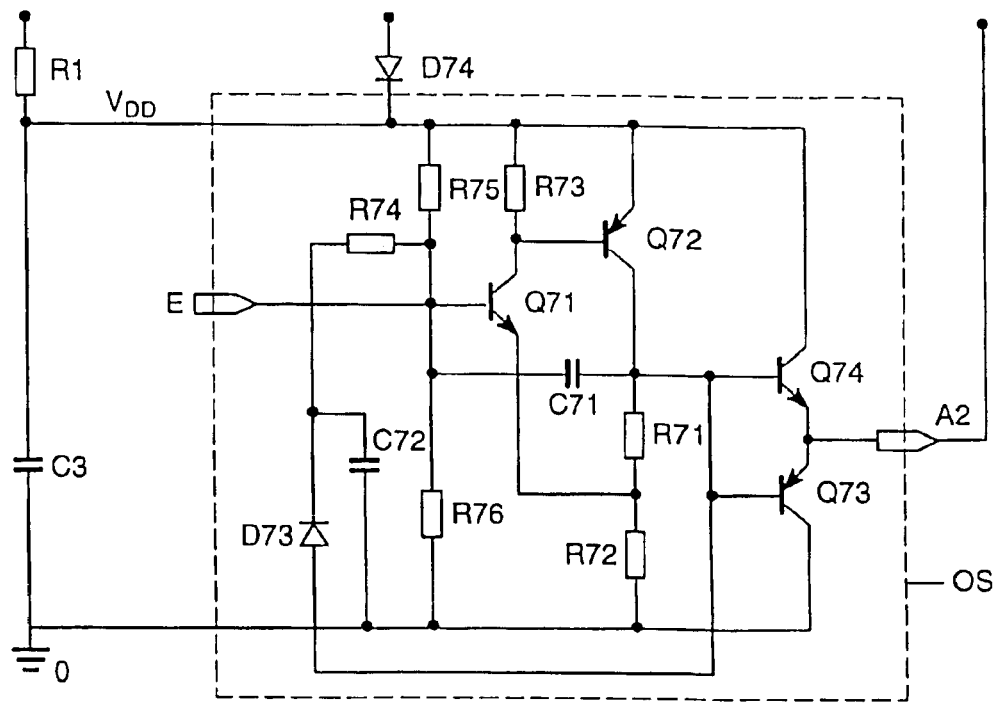
FIG. 2 shows a circuit design of an oscillator circuit from FIG. 1.

As is clear in particular from FIG. 2, the oscillator circuit OS is constructed by means of an internal feedback in such a way that it starts to oscillate when there is a high impedance state of the input E and it is supplied with the voltage $V_{DD}$. The function of the SEPIC converter can thus be started by driving the switching transistor Ti in an oscillating fashion so that the charging and discharging processes of the coils L1 and L2 and of the capacitor C1 are initiated. Starting from a certain point, the supply voltage $V_{CC}$ which is tapped at the coil L2 and rectified and stabilized in the way illustrated in FIG. 1 rises to a sufficient level for the forcing circuit ZS or the microcontroller so that its startup routines begin. As soon as the forcing circuit ZS generates a control signal at its output A1, the input E is connected in low impedance fashion to the respective reference potentials 0 and $V_{CC}$. As a result, the forcing circuit ZS performs the function of forcing the oscillator circuit OS, which subsequently operates as an amplifier or driver and generates an amplified control signal for the switching transistor T1.

The currents which are connected to the supply voltage $V_{CC}$ are relatively large, usually significantly more than 500 µA, in particular when the microcontroller starts. If the forcing circuit ZS or the microcontroller were to be supplied via a circuit which is comparable to the circuit with the resistor R1 and the capacitor C3, the respective resistance would have to be selected to be so small that its power loss would be very disadvantageous in the continuous operating mode. Moreover, the electronic ballast, which is illustrated in this exemplary embodiment can be configured for a wide range of A.C. input voltages (input of the rectifier bridge), the suitable supply voltages $V_{CC}$ being always generated for the microcontroller.

As long as the supply voltage $V_{DD}$ of the amplifier circuit has not yet been reached because the capacitor C3 is not yet charged, the oscillator circuit OS remains inactive and absorbs only a small current.

FIG. 2 shows the oscillator circuit OS within the box comprising dashed lines. The supply $V_{DD}$ via the resistor R1 is shown top left. The connection which leads out upward from the center of the dashed box is the connection for the supply with $V_{DD}$ from the tap at coil L2, as indicated in FIG. 1. A decoupling diode D74 is provided here. On the right there is the output A2, shown on the left in FIG. 1, and on the left the input E, shown on the right in FIG. 1. As a result of the feeding back through C71, the transistors Q71 and Q72 form, together with the resistors R71, R72, R73, R75 and R76 and the capacitor C71, an analog oscillator which oscillates in a self-excited fashion and whose frequency results essentially from the resistance and capacitance values of C71 and R76. However, the self-excited oscillation is possible only for as long as a high impedance is present at the input E. If E is connected to a reference potential with low impedance, the control input (base) of the capacitor Q71, and as a result also the control input of the capacitor Q72 are forced.

The line which leads back from the collector of the capacitor Q72 to the base of the capacitor Q71 via the diode D73 serves to make available an auxiliary current for the base of the transistor Q71 after the oscillator starts and after a drop in the voltage at the capacitor C3 which is determined by the power drain of the oscillator circuit OS. This brings about, as it were, a hysteresis-like dependence on the supply voltage at the capacitor C3.

The transistors Q73 and Q74 are used to amplify current and directly drive the output A2.

A ratio of R75 to R76 can be selected for the threshold voltage for starting up the oscillator circuit, and the lower switch-off threshold when the supply current drops can be selected using R74. The frequency can be selected using C71 and R75/R76, and the pulse width using R71/R72, these two resistors also determining the D.C. amplification.

What is claimed is:

1. A supply circuit having a switching transistor (T1), and a forcing circuit (ZS) for driving a control input of the switching transistor (T1), characterized in that an oscillator circuit (OS) which is connected to the control input is provided and is configured in such a way that a startup operation of the supply circuit firstly carries out an oscillation which is independent of the forcing circuit (ZS) and in doing so actuates the control input of the switching transistor (T1), and the supply circuit is configured in such a way that the forcing circuit (ZS) is supplied, as a result of the driving of the control input by the oscillator circuit (OS), by a supply current produced by the supply circuit, and subsequently performs the driving of the control input of the switching transistor (T1), wherein the oscillator circuit (OS) is an amplifier circuit with a feedback (C71) which has an input (E) which is connected to an output (A1) of the forcing circuit (ZS), and an output (A2) which is connected to the control input of the switching transistor (T1), and serves as an amplifier for the output (A1) of the forcing circuit (ZS) when the control input of the switching transistor (T1) is driven by the forcing circuit (ZS).

2. The supply circuit as claimed in claim 1, comprising a power factor correction circuit (L1, L2, C1, D1, T1) for the harmonic-limited extraction of a D.C. voltage from an A.C. power system.

3. The supply circuit as claimed in claim 2, wherein the power factor correction circuit is a SEPIC converter (L1, L2, C1, D1, T1).

4. The supply circuit as claimed in claim 1, wherein the forcing circuit (ZS) is a microcontroller.

5. The supply circuit as claimed in claim 1, wherein the oscillator circuit has a digital input which is connected to the output of the forcing circuit, and operates as a driver circuit when there is an input level of logic 0 or logic 1, and operates as an oscillator circuit when there is an input level in a nonspecific intermediate region.

6. The supply circuit as claimed in claim 1, wherein the oscillator circuit (OS) operates as an amplifier circuit when there is a low impedance of the input (E) with respect to a reference potential, and as an oscillator circuit when there is a high impedance of the input (E) with respect to the reference potential.

* * * * *